(12) United States Patent
Parmelee

(10) Patent No.: X5860
(45) Date of Patent: Mar. 4, 1830

(54) APPLES, GRINDING, CORN,BARK, & C.

(76) Inventor: David Parmelee

David Parmelee

Letters Patent (Dated March 4. 1830)

The Schedule referred to in these Letters Patent, & making part of the same containing a description in the words of the said David Parmelee himself of his improvement in the machine for reducing various articles, such as apples for cider, dy woods, bark for tanning, corn on the cob, and other materials, to a degree of fineness suitable for the several operations.

The following is a specification or particular description of a new & useful Machine for, or improvements in the method of reducing various articles, such as apples for cider dying woods, bark for tanning, corn on the cobs &c. by cutting, to a degree of fineness suitable for the several operations & uses for which they are respectively designed by means of steel, or iron & steel plates so indented on the projecting edges as to form series of narrow chisels, or cutters, to be inserted longitudinally in the periphery of a revolving cylindrical wheel. The plates are about one inch in width, about one eighth of an inch thick, & vary in length from four to twelve or fifteen inches, according to the work for which they are intended. The teeth, or chisels, upon the edges of the plates, are about one eighth of an inch wide, & the same width apart, ground with a basil edge like a plane iron, are inserted in the cylinder with the basil in the rear of the motion. These teeth, or cutters, are to be so arranged upon the plates that a tooth or cutter in a preceeding plate is followed by a space or interstice in the succeeding plate. The cylinder into which these plates are inserted, may be of various diameters, from twelve to sixteen inches & of lengths corresponding with those of the plates. It is formed by uniting twelve pieces of wood, well jointed together in the form of radii, with the grain of the wood forming these radii, so that the periphery is formed by the ends of the wood; these are strongly bound together by an iron band at each end of the cylinder for which purpose the ends are to project beyond the ends of the plates, & the circumference of the
cylinder is there so cut down or lessened, as to admit the bands
sufficiently within the circumference of the body of the cylinder
to permit the keys or wedges which confine the plates to pass in &
out of the grooves. For the insertion of the plates, longitudinal
grooves of a sufficient depth are cut and of sufficient width
to admit of keys or wedges to be driven by the sides of the plates
to keep them firm, and are susceptible of removal occasionally
in order to take out the plates, or cutters, to grind or sharpen;
to graduate the projection of them to the work, which projection
is ordinarily to be about one twelfth of an inch. The grooves
are so formed as to place the plates about three inches apart
and to give a direction to the projecting edges of the cutters, which
would form an angle of about twelve degrees in advance, with
the radii of the cylinder. This cylindrical wheel, so armed with its
sharp cutters, receives a rapid revolutionary motion, by means
of either cogs, or strap, & may be worked by either water, steam.
wind, manual, or horse power.

In front of the revolving cutters is placed a hopper or feeding
box, so placed as to form an inclined plane, the inclined edge
of which approaches so near the edges of the cutters, as merely
to permit them to revolve without coming in contact, from
which the apples, dyewood, bark, corn ears &c. are fed to the cutt Witnesses David Parmelee Saml. C. Whiting Jno. M. [illegible]

Exd. 1496.

(662 words)